April 21, 1953

R. H. TAYLOR 2,635,573

PIPE WELDING MACHINE

Filed Nov. 8, 1949

INVENTOR.
Robert H. Taylor
BY
ATTORNEY

FIG_2_

April 21, 1953

R. H. TAYLOR 2,635,573

PIPE WELDING MACHINE

Filed Nov. 8, 1949

INVENTOR.
Robert H. Taylor

BY

ATTORNEY

April 21, 1953 — R. H. TAYLOR — 2,635,573
PIPE WELDING MACHINE
Filed Nov. 8, 1949 — 6 Sheets-Sheet 5

INVENTOR.
Robert H. Taylor
BY
ATTORNEY

April 21, 1953     R. H. TAYLOR     2,635,573
PIPE WELDING MACHINE
Filed Nov. 8, 1949     6 Sheets-Sheet 6
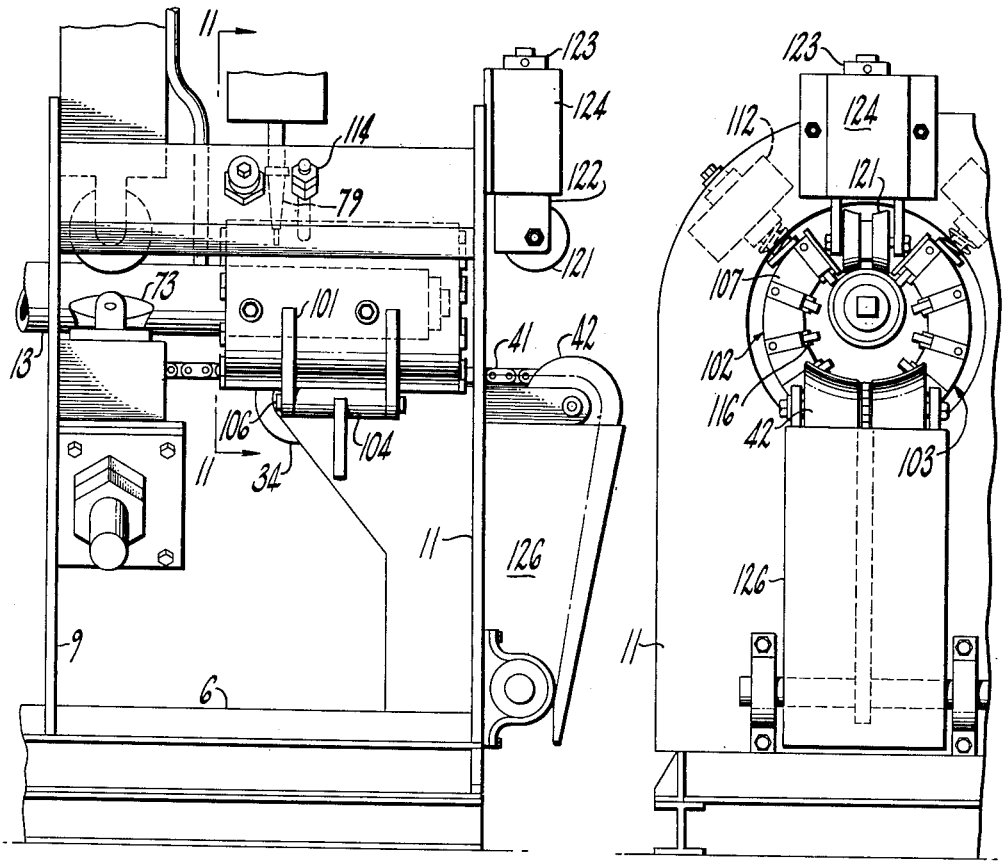
FIG_9_     FIG_10_
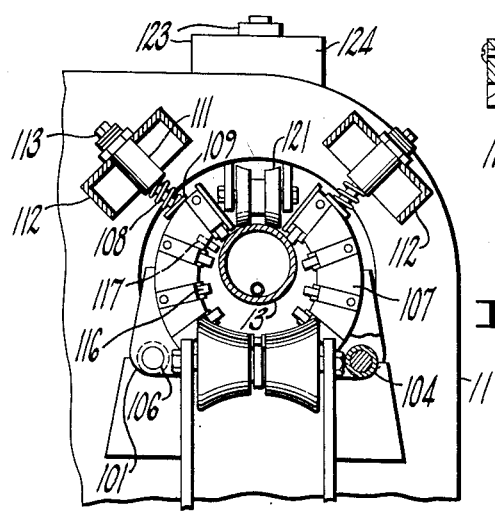 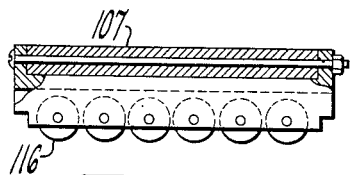
FIG_12_
FIG_11_
INVENTOR.
Robert H. Taylor
BY
*Marcus Lothrop*
ATTORNEY Patented Apr. 21, 1953

2,635,573

UNITED STATES PATENT OFFICE 2,635,573

PIPE WELDING MACHINE

Robert H. Taylor, Perkins, Calif., assignor to Sacramento Pipe Works, Sacramento, Calif., a corporation of California Application November 8, 1949, Serial No. 126,193

1 Claim. (Cl. 113—59)

My invention relates to means for use in seam welding or securing together the facing longitudinal edges of a rolled sheet in the form of a nearly complete cylinder. It is customary in fabricating pipe for wells and the like to take short sections of sheet material, usually steel, and first to roll the sheet until it is of approximately the diameter ultimately desired and so that the edges of the sheet are slightly spaced apart and facing each other. The short sections are then usually held and are welded by a workman so that the facing edges are secured together and the result is approximately a circular cylindrical pipe section, water tight, and able to withstand substantial pressure. For a long pipe, a number of sections so made are welded together at the ends.

It is an object of my invention to provide a pipe welding machine which mechanically effectuates the described operation with very little operator supervision, being substantially automatic in most of its operation.

Another object of my invention is to provide a pipe welding machine effective to produce pipe sections of substantially uniform character and dimensions.

Another object of the invention is to provide a pipe welding machine that can be operated by an unskilled workman.

A further object of the invention is to provide a pipe welding machine capable of use with pipe sections which have been previously rolled into position in the standard or customary way so that no additional or special equipment is necessary.

A still further object of the invention is to provide a pipe welding machine effective to produce a large number of pipe sections in a short time, and a welding machine especially effective to overcome the disadvantage of excessive wear that may be generated or imparted during welding.

A still further object of the invention is to provide a pipe welding machine in which the pipe sections are in true alignment or shape when they have passed through the machine.

A still further object of the invention is in general to improve and to provide an economical and feasible pipe welding machine.

Other objects together with the foregoing are attained in the embodiment of the invention described in the accompanying description and disclosed in the accompanying drawings in which Figure 1 is a side elevation of my pipe welding machine, a portion of the structure being broken away to reduce the size of the figure.

Figure 9 is a side elevation of the discharge end of a modified form of pipe welding machine.

Figure 10 is a front elevation of the machine illustrated in Figure 9, portions being broken away.

Figure 11 is a cross-section the plane of which is indicated by the line 11—11 of Figure 9.

Figure 12 is a detail showing a roller block in side elevation.

Figure 1:
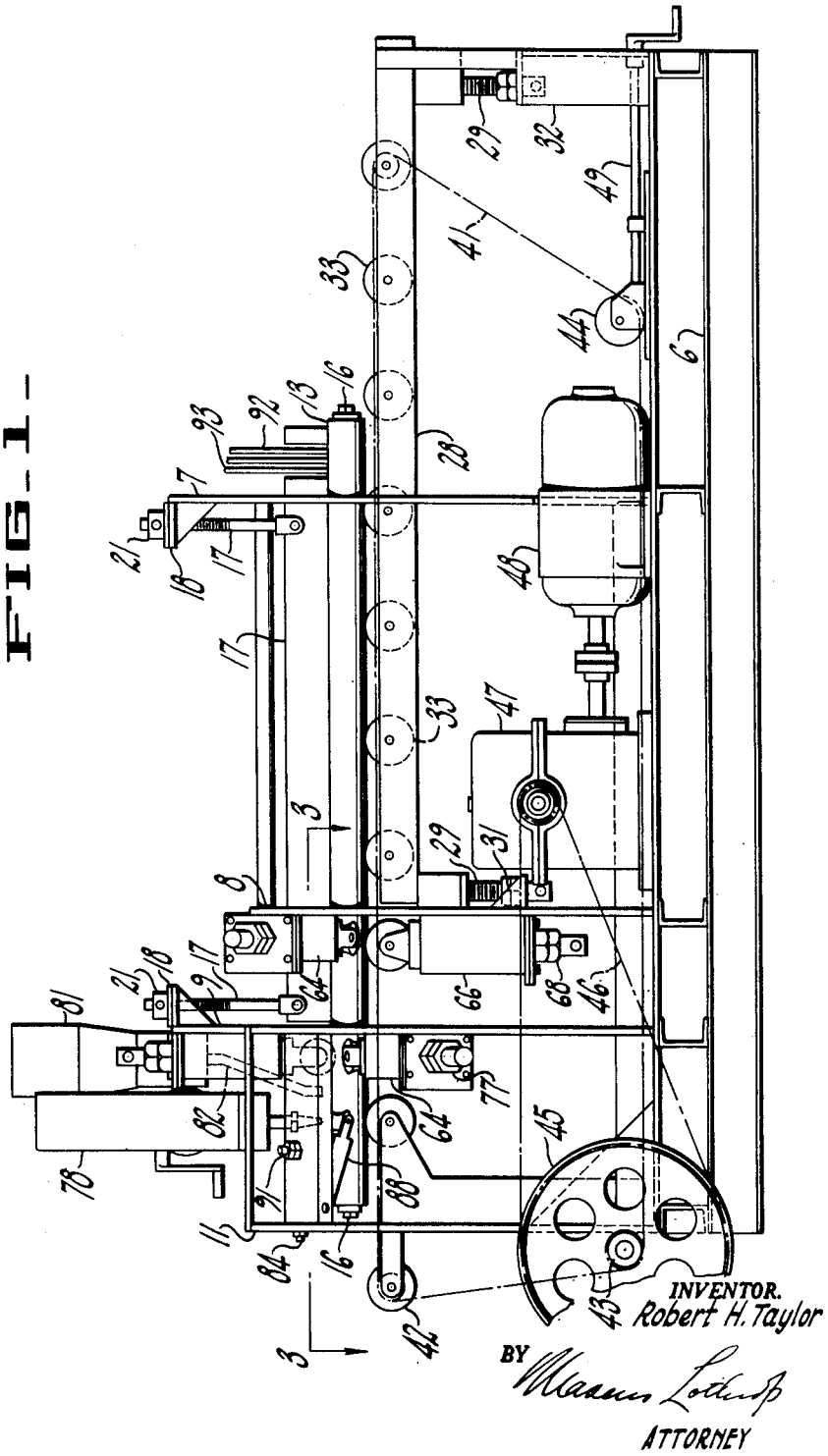
Figure 2:
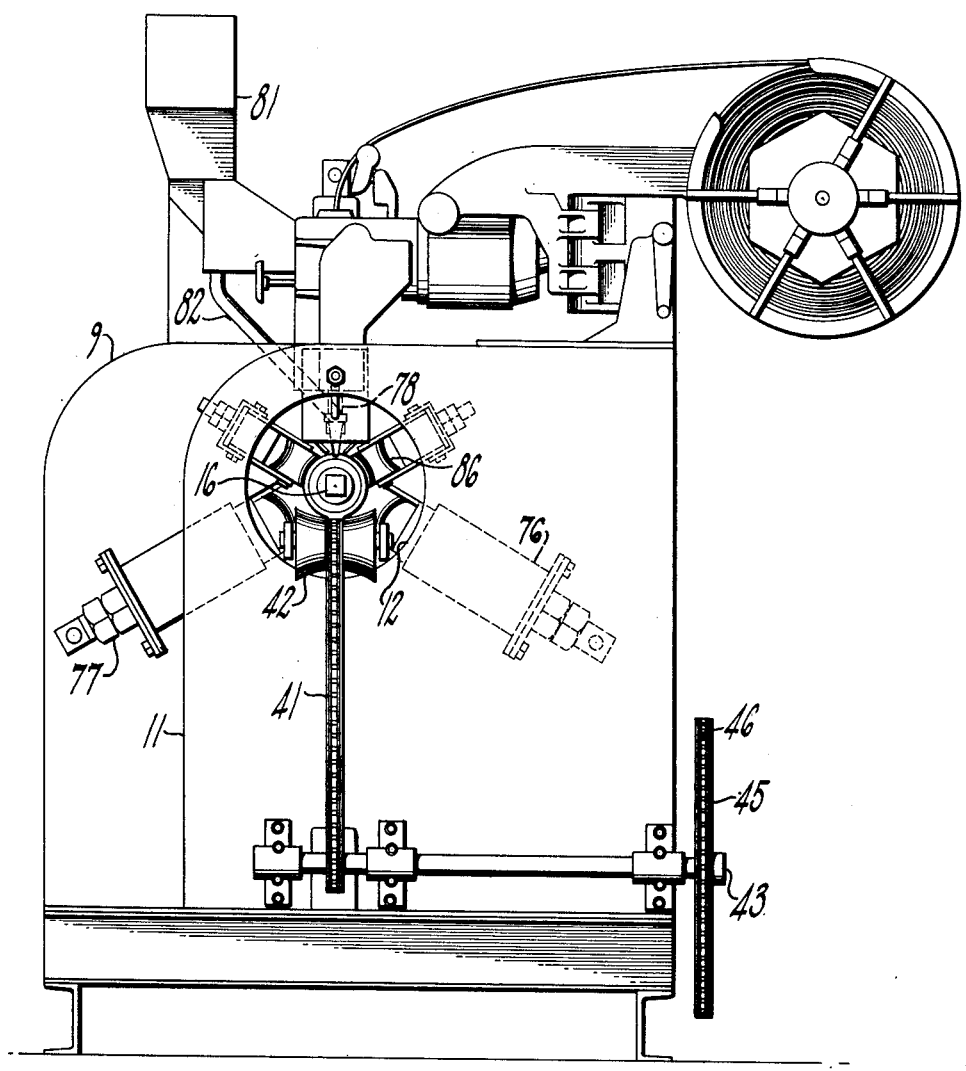
Figure 2 is a front elevation of my pipe welding machine to an enlarged scale.

While the pipe welding machine of my invention can readily be embodied in a number of different forms depending in part upon the desired capacity of the machine, the size of the pipe sections to be welded and the type of welding device to be utilized, it has successfully been embodied in the form shown in the drawings and has attained the mentioned objects.

In this form of the pipe welding machine, there is provided a main frame 6 comprised of a number of structural and other shapes assembled, usually by welding, to provide a substantial base for the machine. Upstanding from the remainder of the frame 6 are upright or superstructure members 7, 8 and 9 particularly and a forward member 11. The members 7, 8 and 9 as well as the member 11 are primarily transversely extending vertical plates having aligned apertures 12 formed in them to define, in effect, a free passageway.

The apertures 12 in the plates 7, 8 and 9 are of sufficient size readily to accommodate a mandrel 13 disposed therein. The mandrel is an important part of the pipe welding machine and in general is a hollow, circular cylindrical member conveniently made up of a pipe 14 threaded and provided with plugs 16 at its opposite ends. Extending along the mandrel for a part only of its length is a readily projecting fin 17 relatively narrow in width and firmly secured as by welding, to the pipe 14. The fin is supported and in turn supports the mandrel by a pair of clevis ended bolts 17 depending from appropriate brackets 18 on the superstructure members 7 and 9. The bolts 17 terminate in screw nuts 21 so that upon the establishment of an individual adjustment for the nuts 21, the pin 17 and correspondingly the mandrel 13 can be disposed in any selected position with respect to the frame and extending through the various apertures 12.

Figure 4:
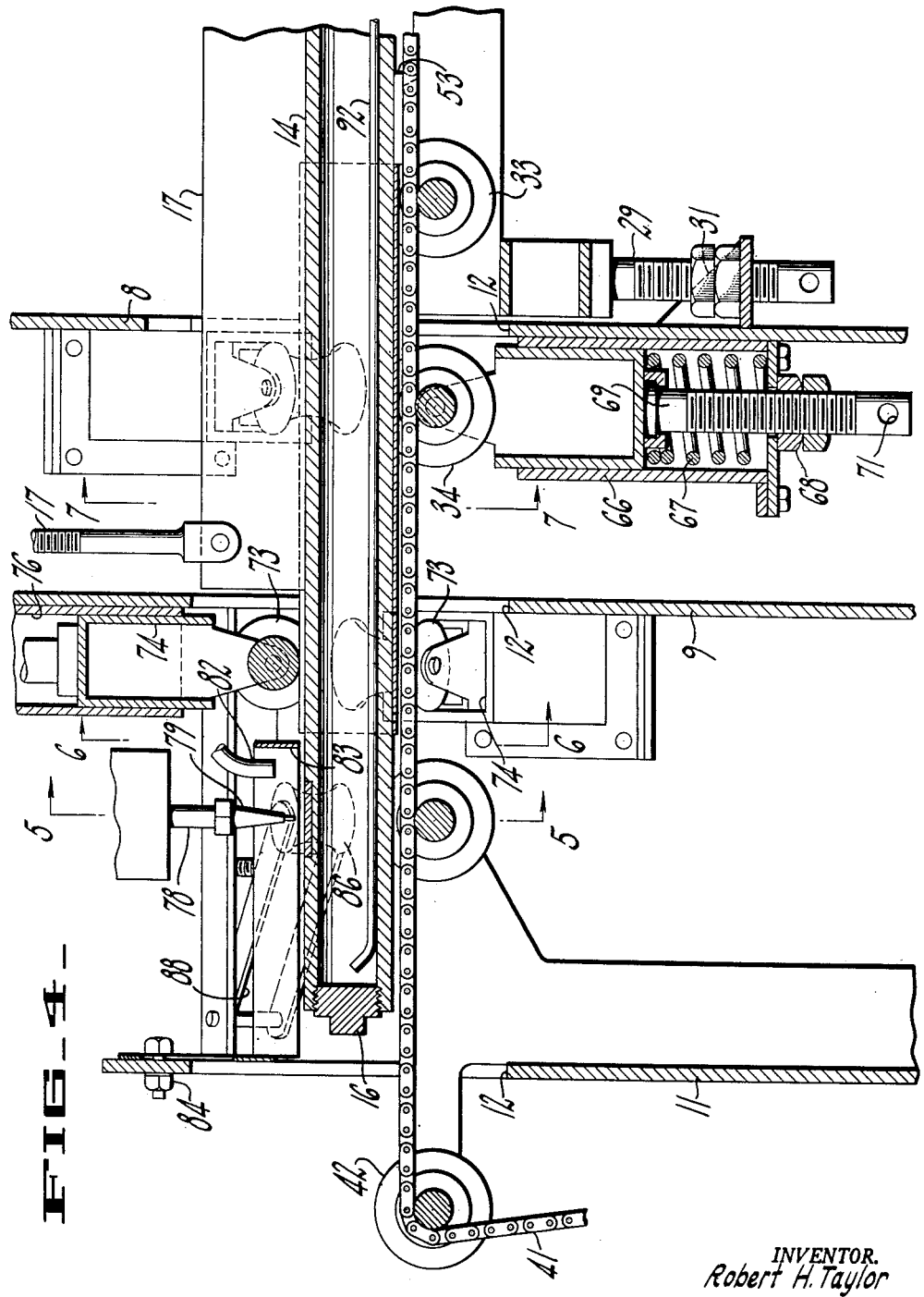
Figure 4 is a cross-section the plane of which is indicated by the line 4—4 of Figure 3.
Figure 5:
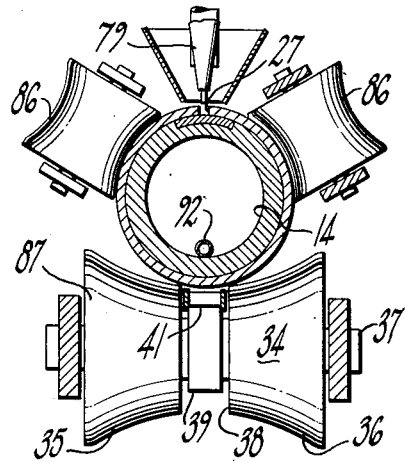
Figure 5 is a partial cross-section the plane of which is indicated by the line 5—5 of Figure 4.

The purpose of the mandrel is to provide a support and a form for a pipe section 26 (Figure 4 and Figure 5). The pipe section is previously rolled from a sheet of metal and is approximately a circular cylinder slightly larger in internal diameter than the diameter of the mandrel 13. It is formed with a remaining, longitudinally extending, central gap or slot 27 of a slightly greater width than the thickness of the fin 17. The pipe section 26 is readily disposed over the mandrel 13 by a longitudinal movement with the slot or opening 27 disposed with its edges at either side of the fin.

In order to convey the pipe section along the mandrel and advance it through the machine, there is provided a conveyor mechanism. Included in such mechanism is a sub-frame 28 comprised of appropriate structural members supported in a selected position with respect to the main frame 6 by jack screws 29 resting upon appropriate brackets 31 and 32 forming part of the main frame. Manipulation of the screw jacks 29 disposes the sub-frame 28 at any selected position with regard to the main frame and also with regard to the mandrel 13. The position selected at any one time for the sub-frame is a position largely dictated by the thickness of the pipe section being handled and in part by the diameter of such section.

Disposed on the sub-frame is a plurality of supporting rolls 33. These rolls are all substantially alike and are virtually identical with the lower roll 34 especially shown in Figure 5. Each of them includes an opposite pair of approximate cones 35 and 36 located to revolve on an axle 37 carried by the sub-frame 28. The cross sectional contour of the roll is arcuate about a center approximately the same as that of the mandrel. While the curved relationship of the roll cross section and of the mandrel cross section is only approximate, the function of the rolls in supporting pipe sections 26 of different diameters is to hold or press the pipe section into sliding engagement with the mandrel.

Between the conical portions 35 and 36, each of the rolls 33 is provided with a circumferential groove 38 disposed immediately below the mandrel center. Adapted to run in part on a hub 39 and largely within the grooves 38 of the successive rollers 33 is a conveyor chain 41. This extends longitudinally beneath the mandrel 13 and over an idler roll 42 at the end of the welding machine, over a drive sprocket 43 and over a take-up idler 44. The drive sprocket 43 is driven through a reduction wheel 45 and in turn driven by a chain 46 connected to a speed reducer on the frame 6. The idler 44 is mounted on the frame 6 by a suitable slack take-up 49 so that the tension in the conveyor chain 41 can be readily regulated to an appropriate value depending in part on the selected position of the sub-frame.

Figures 7, 8:
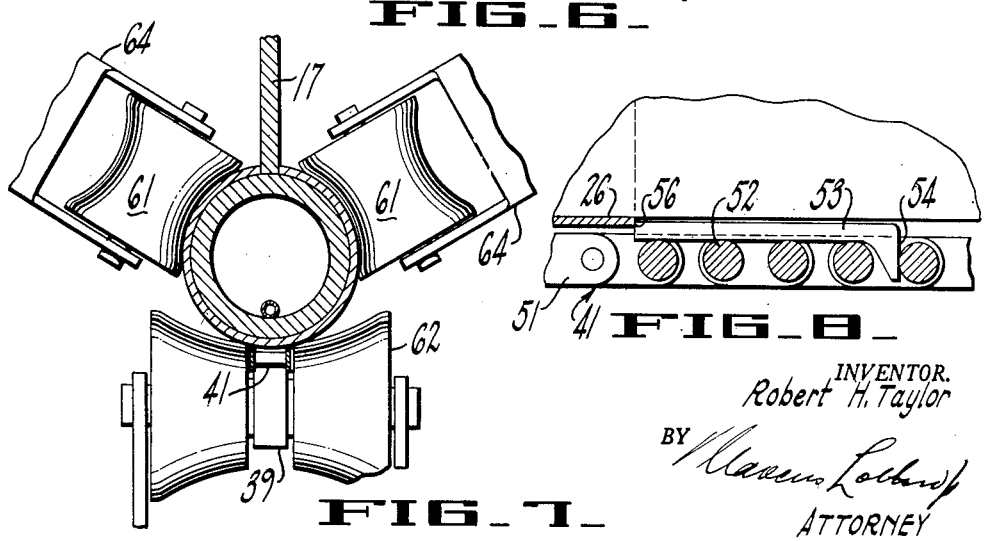
Figure 7 is a partial cross-section the plane of which is indicated by the line 7—7 of Figure 4.
Figure 8 is a longitudinal, vertical cross-section of a fragment of the conveyor portion of the pipe welding machine.

The conveyor chain 41, as especially shown in Figure 8, is made up of a plurality of links 51 having cross pins 52 extending between them. Designed to rest upon successive ones of the cross pins 52 and to inter-engage between any pair of them, is a driving bar 53. This is a loose metal member having a tail 54 depending between successive pins 52 and readily placed in such position or removed therefrom by an operator. The height of the driving bar is such that it will pass readily between the pins and the mandrel 13 and will likewise and especially engage the trailing end 56 of a pipe section 26. As the conveyor advances through the machine and over the rolls 33, a bar 53 placed upon the chain by the operator just behind a pipe section previously placed by him on the mandrel, engages that pipe section and forces it to advance along the length of the mandrel.

As the pipe section moves along it is brought more closely into contact with the central fin 17 by a number of radially movable rolls 61 and 62. The upper two rolls 61 are of a continuous arcuate cross section approximately concentric with the mandrel whereas the lower roll 62 is the same contour as the rolls 33 and 34 in order to accommodate the conveyor chain 41. Each of the rolls 61 and 62 is mounted in a radially movable box-like supporting member 64 slidably disposed in an enclosing frame 66 mounted on the main frame 6. A relatively heavy spring 67 is disposed within the housing 66 and bears against the head of the housing and against the member 64. The rolls are all urged in a direction to press the pipe section against the mandrel and to press the edges of the slot or groove 27 toward the fin 17. The spring mounting likewise permits the rollers to yield in the event of irregularities in the pipe section. The force of the spring is checked so that the roll and pipe friction is not too heavy by means of adjusting nuts engaging the threaded end of the stem 69 rotatably anchored in the frame 64.

As an alternative, the spring 67 is omitted and one of the nuts 68 is welded or otherwise fastened to the head of the housing 66. Then, by the insertion of a suitable tool through an aperture 71 in the screw stem 69 and after the other of the nuts 68 has been slackened, the roll can be moved into a set position and the loosened nut 68 then tightened again in order to afford a lock.

With this mechanism, the pipe section although only loosely conforming to the shape of the mandrel as it enters the machine, is brought quite closely into contact with the mandrel and is so made to assume an appropriate form. It is desirable, however, to reduce the size of the gap or slot 27 from its original variable or random value to a selected smaller value.

Figure 3:
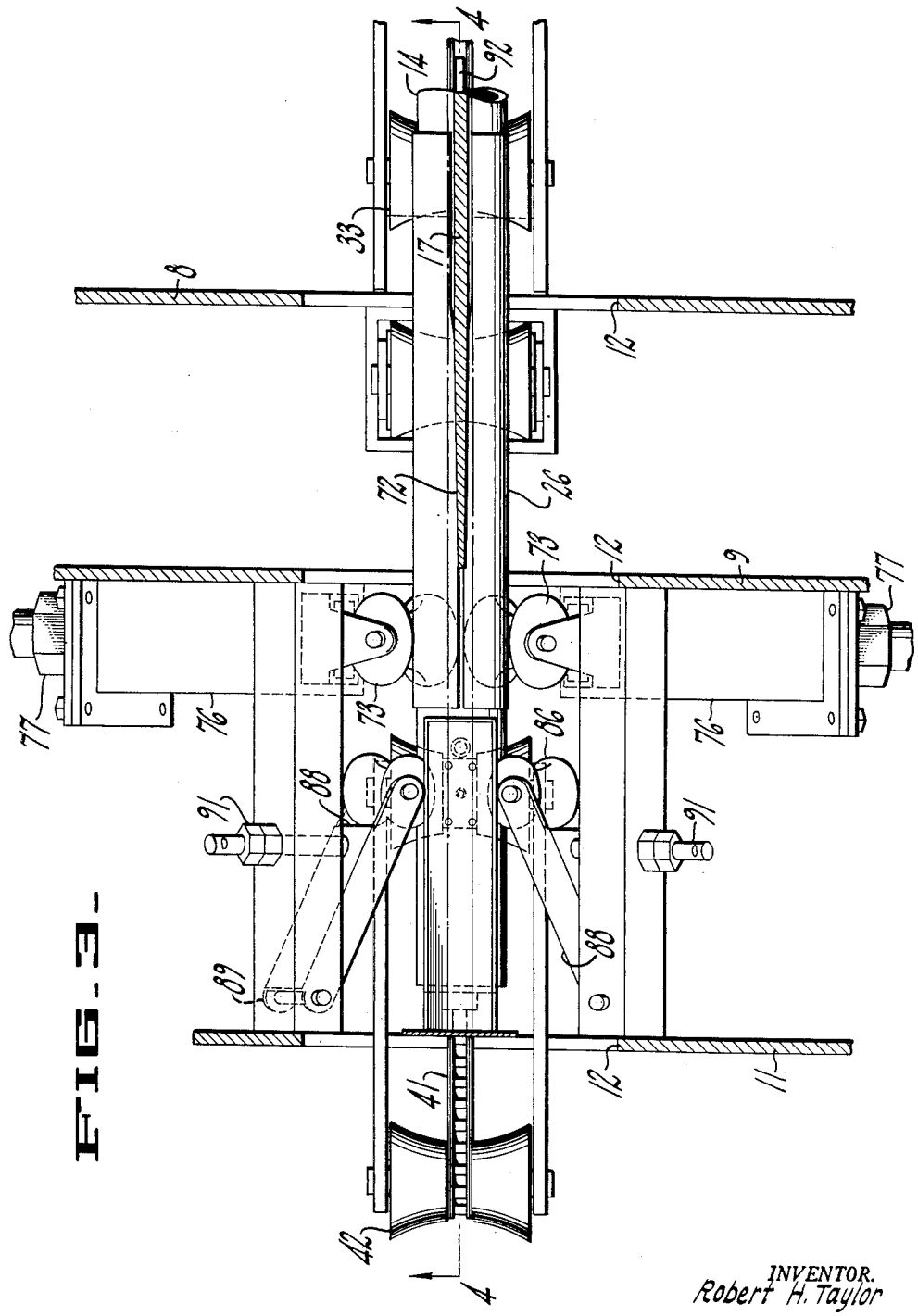
Figure 3 is a cross-section to an enlarged scale, the plane of section being indicated by the line 3—3 of Figure 1.
Figure 6:
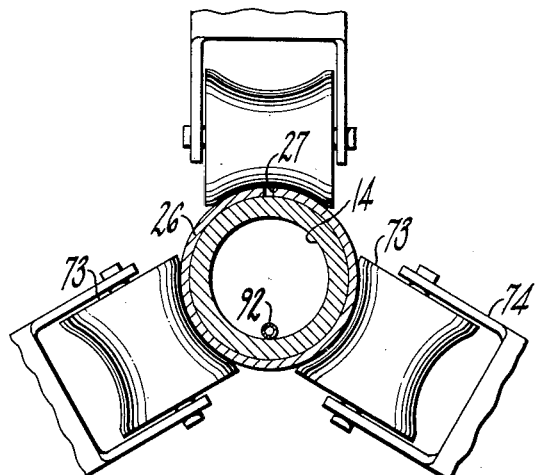
Figure 6 is a partial cross-section the plane of which is indicated by the line 6—6 of Figure 4.

For that reason, as especially shown in Figure 3, one end 72 of the fin 17 is reduced in width or tapered so that it permits the edges of the slot to converge as the rolls 61 and 62 act upon the advancing pipe section. To assure the appropriate contour and to hold the converged pipe section, the rolls 61 and 62 are supplemented by quite comparable rolls 73, as especially shown in Figure 6. These rolls are all identical with the rolls 61 as the lower two are spaced to either side of the conveyor 41 and it is therefore not necessary to provide any central groove.

Each of the rolls 73 is mounted in an adjusting frame 74 carried in a guide 76 forming a support and secured to the frame 6. Adjusting devices 77 provide a way of imposing the desired pressure between the rolls 73 and the advancing pipe section. The upper roll 73 is in substantial alignment with the end of the fin 17 and assures that the edges of the pipe section are appropriately pressed toward each other and toward the mandrel so that a standardized gap appropriate for welding remains between the pipe section edges.

Since the previously rolled pipe section has by this means been brought into an appropriate form of welding, it advances along the mandrel to a welding station. At the welding station, especially shown in Figure 4, a suitable welding device 78 is disposed just behind the upper one of the rollers 73 and in approximate line with the fin 17 but at a portion of the mandrel where the fin has been interrupted. The welding device itself forms no particular part of the present structure since any standard form of welding mechanism readily available on the commercial market may be utilized. Such structure is appropriately mounted in position on the frame 6 and in the present instance is disclosed as an electric arc welding mechanism having an electrode structure 79 in position in alignment with the fin 17 and in spaced position with respect to the mandrel. The welding mechanism is operable in connection with a fluxing or protecting powder discharged from a tank 81 through a conduit 82 into an enclosing band 83 encompassing the welding station and the welding electrode 79 and supported with some freedom of adjustment by a fastening 84 on the forward superstructure member 11.

As the pipe section advances into the welding station with the gap 27 in a proper position with respect to the electrode 79 for welding, as shown in Figure 5, the pipe section is further maintained in shape by a plurality of rolls 86 at the upper portion and a roll 34 at the lower portion. The upper rollers are smooth and the lower roller is grooved in order to accommodate the conveyor chain. These rolls are carried on swinging arms 88 mounted by pivots 89 on the frame 6 and are provided with appropriate adjustments 91 so that the pressure of the individual rolls upon the pipe section can be regulated and so that exactly at the welding station the pipe section will be appropriately confined to its desired shape in firm contact with the mandrel.

As the pipe section advances beneath the electrode 79, an arc passes from such electrode to the edges of the pipe section and possibly also to a welding plate 91 set into the surface of the mandrel 14 and preferably of copper or other good electric and heat conducting material. The heat given off by the welding operation in some instances is highly disadvantageous and for that reason there are provided means for maintaining the temperature at the welding station at the desired level. This preferably includes a cooling liquid circulating system incorporating a conduit for carrying cooling liquid for substantially the length of the interior of the mandrel and permitting it to discharge at the forward end thereof. A supply pipe 92 extends from one end of the mandrel and along the interior of the mandrel to a point near the opposite end thereof emerging through a cut-out portion of the fin 17, the supply pipe being of no greater width than the width of the fin. Cooling liquid which has absorbed any excessive heat at the welding station travels throughout the length of the mandrel, maintaining the temperature thereof substantially uniform, and discharges from the hollow interior through a pair of discharge pipes 93 for recirculation after cooling or for discharge to waste.

As the welding proceeds concurrently with advancement of the pipe section, the heat is carried away, a weld is appropriately made, and the pipe section is then a complete cylinder. It continues to be advanced by the conveyor until all of it has passed beneath the welding electrode 79 and the section then discharges as the conveyor chain rounds the roll 42. The drive member 53 is removed by an operator or falls out by gravity into a suitable receptacle and is then carried to the opposite end of the machine for reuse with a subsequent section.

In some instances, particularly where the final circular cylindrical shape of the welded pipe is of considerable importance and where it is desired to hold the shape quite accurately despite distortions normally introduced therein by the welding heat, I provide a slightly modified structure as especially illustrated in Figures 9, 10, 11 and 12. In this form of the device, the structure is virtually identical with that previously described except that the rollers 86 and their carriers or frames 88 are omitted and are replaced by a more extensive confining mechanism. The forward upright member 11 carrying the customary roller 34 and supporting the forward idler roll 42 for the chain 41, is especially equipped on the uprights 101 with a pair of mechanisms 102 and 103 which are identical on opposite sides of the vertical plane of symmetry.

Each of the mechanisms 102 and 103 includes a hinge mount 104 suitably fastened to the support 101 and carrying a hinge pin 106 pivotally supporting an arcuate backing frame 107. This frame generally corresponds to the envelope contour of the pipe sections being welded and is held in any adjusted position about the pin 106 as an axis by a backing spring 108. A foot 109 engages a part of the frame 107 under pressure by the spring 108. At its other end, the spring is disposed in a socket 111 carried in a channel 112 spanning the space between the upright 9 and the forward upright 11. An adjustment 113 is provided for the spring 108 and in addition an adjustable stop pin 114 is mounted on the channel 112 in a position to be abutted by the mechanism 107 to preclude any excessive spreading movement.

The interior, generally arcuate face of the member 107 is provided with a number of files or rollers 116 each of relatively small diameter and arranged generally along an envelope curve corresponding to the curvature of the pipe being welded. The various rollers 116 in each file or series are in a generally converging relationship with the similar rollers in an adjacent series so that the two mechanisms 102 and 103 in general define rather closely and at a number of points, an envelope contour which establishes and sets the final contour of the pipe being discharged from the machine at the welding station. By appropriately adjusting the mechanisms 102 and 103, the final shape of the welded pipe being discharged is held to quite close limits of concentricity and linearity. To improve the character of the weld, a ground bar or strap 117 is preferably included in one of the mechanisms 102 and is spring-pressed to rub against the pipe being welded.

Furthermore, it is sometimes desirable to provide a final upper roller 121 mounted on a frame 122 supported for axial adjustment by a regulating nut 123 supported in a housing 124 mounted at the forward portion of the upright plate 11. The roller 121 is movable readily and rides directly over the welded seam in the pipe so that the pipe not only does not tend to kick up under the influence of the conveyor chain 41 as it is being discharged and relieved of restraint, but also in order that the welded seam itself will be finally rolled and disposed in the proper circular location. As an added safety feature, the conveyor chain 41 and parts of the roller 42 are protected by a guard 126 mounted on the forward plate 11. In this version of the mechanism, the final discharge of the welded pipe is carefully regulated and the pipe itself is confined at numerous points as it advances in order that its ultimate shape will be closely held to the desired limits.

I claim:

A pipe welding machine comprising a frame including a series of spaced superstructure members having aligned apertures therein, a circular-cylindrical hollow mandrel, a continuous longitudinal fin upstanding from a part of the length of said mandrel, said fin having substantially parallel walls for a portion of its length and having converging walls for the remainder of its length, means extending through said aligned apertures and engaging said superstructure members and said fin at spaced points for supporting said mandrel in selected positions, rolls disposed on said frame beneath said mandrel, said rolls having an arcuate cross-sectional contour substantially concentric with said mandrel for urging a pipe-section toward and against said mandrel and having a central groove, a conveyor chain supported on said frame and in part disposed in said grooves for advancing said pipe-section along said mandrel to a welding station on said mandrel beyond said fin, additional rolls on said frame for pressing said advancing pipe-section toward and against said mandrel and said fin, and a welding device on said frame in cooperative relationship with said mandrel at said welding station.

ROBERT H. TAYLOR.

References Cited in the file of this patent

UNITED STATES PATENTS

| Number | Name | Date |
|---|---|---|
| 1,330,765 | Pearne | Feb. 10, 1920 |
| 1,706,393 | Fay | Mar. 26, 1929 |
| 1,919,186 | Cooper | July 25, 1933 |
| 1,983,930 | Carlsen | Dec. 11, 1934 |
| 2,084,889 | Blevins | June 22, 1937 |
| 2,268,368 | Anderson | Dec. 30, 1941 |
| 2,517,574 | Jones | Aug. 8, 1950 |
| 2,526,723 | Berkeley | Oct. 24, 1950 |